US008357069B2

(12) United States Patent
Diemer et al.

(10) Patent No.: US 8,357,069 B2
(45) Date of Patent: Jan. 22, 2013

(54) MULTI-SPEED TRANSMISSION HAVING AUTOMATIC AND MANUAL MODES

(75) Inventors: Larry D. Diemer, Clarkston, MI (US);
Farzad Samie, Franklin, MI (US);
David W. Wright, Howell, MI (US);
Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 12/884,907

(22) Filed: Sep. 17, 2010

(65) Prior Publication Data
US 2012/0071291 A1 Mar. 22, 2012

(51) Int. Cl.
*F16H 3/44* (2006.01)
(52) U.S. Cl. ........................ 475/289; 475/312
(58) Field of Classification Search .................. 475/289, 475/312
See application file for complete search history.

(56) References Cited

U.S. PATENT DOCUMENTS

| 7,699,741 | B2 | 4/2010 | Hart et al. | |
| 8,029,403 | B2 * | 10/2011 | Lee et al. | 475/276 |
| 2008/0207381 | A1 | 8/2008 | Wittkopp et al. | |
| 2009/0280941 | A1 | 11/2009 | Dusenberry et al. | |
| 2010/0063693 | A1 | 3/2010 | Lee et al. | |

OTHER PUBLICATIONS

Farzad Samie and Chunhao Joseph Lee, Selectable One-Way Clutch in GM's RWD 6-Speed Automatic Transmissions, SAE Int., Jan. 2009, vol. 2, Issue 1, Brice Pawley Means Industries, USA.

* cited by examiner

*Primary Examiner* — David D Le
*Assistant Examiner* — Derek D Knight

(57) ABSTRACT

A transmission is disclosed having an input member, an output member, and first, second, third and fourth planetary gear sets each having first, second and third members. A plurality of interconnecting members continuously interconnect one of the first, second and third members of one of the planetary gear sets with one of the first, second and third members of another of the planetary gear sets. Five torque-transmitting mechanisms are selectively engageable in combinations of at least three to establish at least eight forward speed ratios and at least one reverse speed ratio between the input member and the output member. The first of the five torque-transmitting mechanisms is a selectable one-way clutch engageable to interconnect the third member of the first planetary gear set with the stationary member.

20 Claims, 3 Drawing Sheets

| GEAR STATE | 26 | 24 A | 24 M | 32 | 28 | 30 |
|---|---|---|---|---|---|---|
| R | X | L | L | | | X |
| N | O | O | O | | | |
| 1ST | X | U | L | | X | |
| 2ND | X | U | L | X | | |
| 3RD | | U | L | X | X | |
| 4TH | | U | L | X | | X |
| 5TH | | U | L | | X | X |
| 6TH | | U | U | X | X | X |
| 7TH | X | U | U | | X | X |
| 8TH | X | U | U | X | | X |

*Fig-5*

MULTI-SPEED TRANSMISSION HAVING AUTOMATIC AND MANUAL MODES

FIELD

The invention relates to a multi-speed transmission having both a plurality of planetary gear sets and torque-transmitting devices that are selectively engageable to achieve multiple gear ratios in both an automatic mode and a manual mode.

BACKGROUND

The statements in this section merely provide background information related to the present disclosure and may or may not constitute prior art.

A multi-speed transmission uses a combination of clutches, planetary gear arrangements, and fixed interconnections to achieve a plurality of gear ratios. In one example, friction type clutches are used in the transmission, and are selectively engaged to achieve a particular gear ratio. However, when disengaged, the friction clutches tend to produce drag when there is relative motion between the clutch input member and output member, which can lead to decreased fuel economy.

In an effort to improve fuel economy, a one-way clutch may be employed instead of a friction clutch to transmit power from a first input member to a second driven member. The one-way clutch transmits torque in a first direction and releases or decouples in a second, opposite direction. Once released, the driving member is free to rotate in the second opposite direction relative to the first direction, and the one-way clutch can overrun or freewheel. This allows the vehicle to travel in a coasting or gliding mode where the drivetrain is decoupled from the engine, thus eliminating any losses associated with the drivetrain turning the engine.

Engine braking occurs when torque to the driving member is reduced, the driving member and the driven member remained coupled to one another, and back torque as a result of turning the engine with reduced power and pumping forces is transmitted in an effort to reduce the speed of the driven member. However, freewheeling the one-way clutch decouples the driven and the driving member, thereby making engine braking not possible. Thus, engine braking in a vehicle operated with a one-way clutch will not work unless additional components are included, such as an additional clutch to selectively couple the driving member and the driven member.

Thus, while current transmissions achieve their intended purpose, there is a need for a new and improved transmission which exhibits improved performance while allowing engine braking.

SUMMARY

A transmission is provided having an input member, an output member, first, second, third and fourth planetary gear sets each having first, second and third members, a first interconnecting member continuously interconnecting the first member of the first planetary gear set with the first member of the second planetary gear set, a second interconnecting member continuously interconnecting the second member of the first planetary gear set with the third member of the fourth planetary gear set, a third interconnecting member continuously interconnecting the third member of the second planetary gear set with the first member of the third planetary gear set, a fourth interconnecting member continuously interconnecting the second member of the third planetary gear set with a second member of the fourth planetary gear set. Five torque-transmitting mechanisms are each selectively engageable to interconnect at least one of the first, second and third members with at least one other of the first, second and third members and a stationary element. The torque-transmitting mechanisms are selectively engageable in combinations of at least three to establish at least eight forward speed ratios and at least one reverse speed ratio between the input member and the output member. A first of the five torque-transmitting mechanisms is a selectable one-way clutch engageable to interconnect the third member of the first planetary gear set with the stationary member.

In one example of the present invention, a second of the five torque-transmitting mechanisms is selectively engageable to interconnect the first member of the first planetary gear set with a stationary member.

In another example of the present invention, a third of the five torque-transmitting mechanisms is selectively engageable to interconnect the second member of the second planetary gear set with the first member of the fourth planetary gear set.

In yet another example of the present invention, a fourth of the five torque-transmitting mechanisms is selectively engageable to interconnect to the first member of the third planetary gear set with the first member of fourth planetary gear set.

In yet another example of the present invention, a fifth of the five torque-transmitting mechanisms is selectively engageable to interconnect the third member of the third planetary gear set with the first member of the fourth planetary gear set.

In yet another example of the present invention, the first members are sun gears, the second members are carrier members and the third members are ring gears.

In yet another example of the present invention, the input member is continuously connected to the carrier member of the second planetary gear set and the output member is continuously connected to the carrier member of the fourth planetary gear set.

In yet another example of the present invention, the transmission is operable in at least one of an automatic mode and a manual mode.

In yet another example of the present invention, the selectable one-way clutch is operable in each of a locked position and an unlocked position. In the locked position the selectable one-way clutch interconnects the third member of the first planetary gear set with the stationary member. In the unlocked position the selectable one-way clutch prevents rotation of the third member of the first planetary gear set in a first rotary direction and allows rotation of the third member of the first planetary gear set in a second rotary direction.

In yet another example of the present invention, the selectable one-way clutch is in the locked position when the transmission is operating in at least one of the automatic or manual modes and is engaged in the reverse speed ratio and when the transmission is operating in manual mode and is engaged in the first, second, third, fourth and fifth of eight speed ratios.

In yet another example of the present invention, the selectable one-way clutch is in the unlocked position when the transmission is operating in automatic mode and is engaged any of the eight forward speed ratios.

The above features and advantages and other features and advantages of the present invention are readily apparent from the following detailed description of the best modes for carrying out the invention when taken in connection with the accompanying drawings.

DRAWINGS

FIG. 5 is a truth table listing the engaged torque-transmitting mechanisms for selected torque ratios achieved by the transmission of FIG. 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These mechanical connections generically link or relate the transmission embodiments. More specifically, a first component or element of a first planetary gear set is permanently coupled to a first component or element of the second planetary gear set. A second component or element of the first planetary gear set is permanently coupled to a third component or element of a fourth planetary gear set. A third component or element of the second planetary gear set is permanently coupled to a third component or element of a third planetary gear set. A second component or element of the third planetary gear set is permanently coupled to a second component or element of the fourth planetary gear set.

Figure 1:
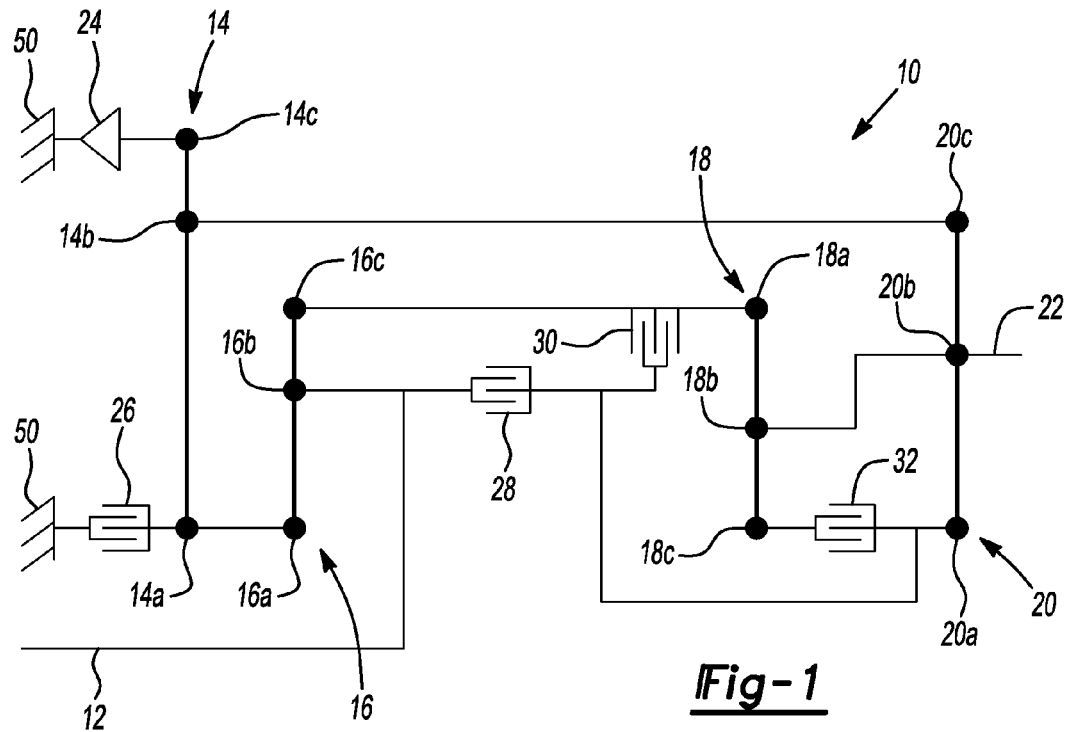
FIG. 1 is a lever diagram of an example of the transmission in accordance with the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque-transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the second node 16A of the second planetary gear set 16. The first node 14A of the first planetary gear set 14 is coupled to the first node 16A of the second planetary gear set 16. The second node 14B of the first planetary gear set 14 is coupled to the third node 20C of the fourth planetary gear set 20. The third node 16C of the second planetary gear set 16 is coupled to the first node 18A of the third planetary gear set 18. The second node 18B of the third planetary gear set 18 is coupled to the second node 20B of the fourth planetary gear set 20. The output member 22 is coupled to the second node 20B of the fourth planetary gear set 20.

A first torque-transmitting mechanism 24 selectively connects the third node 14C of the first planetary gear set 14 with a stationary element or transmission housing 50. A second torque-transmitting mechanism 26 selectively connects the first node 14A of the first planetary gear set 14 with the transmission housing 50. A third torque-transmitting mechanism 28 selectively connects the input member 12 and the second node 16B of the second planetary gear set 16 with the first node 20A of the fourth planetary gear set 20. A fourth torque-transmitting mechanism 30 selectively connects the third node 16C of the second planetary gear set 16 and the first node 18A of the third planetary gear set 18 with the first node 20A of the fourth planetary gear set 20. A fifth torque-transmitting mechanism 32 selectively connects the third node 18C of the third planetary gear set 18 with the first node 20A of the fourth planetary gear set 20A.

Figure 2:
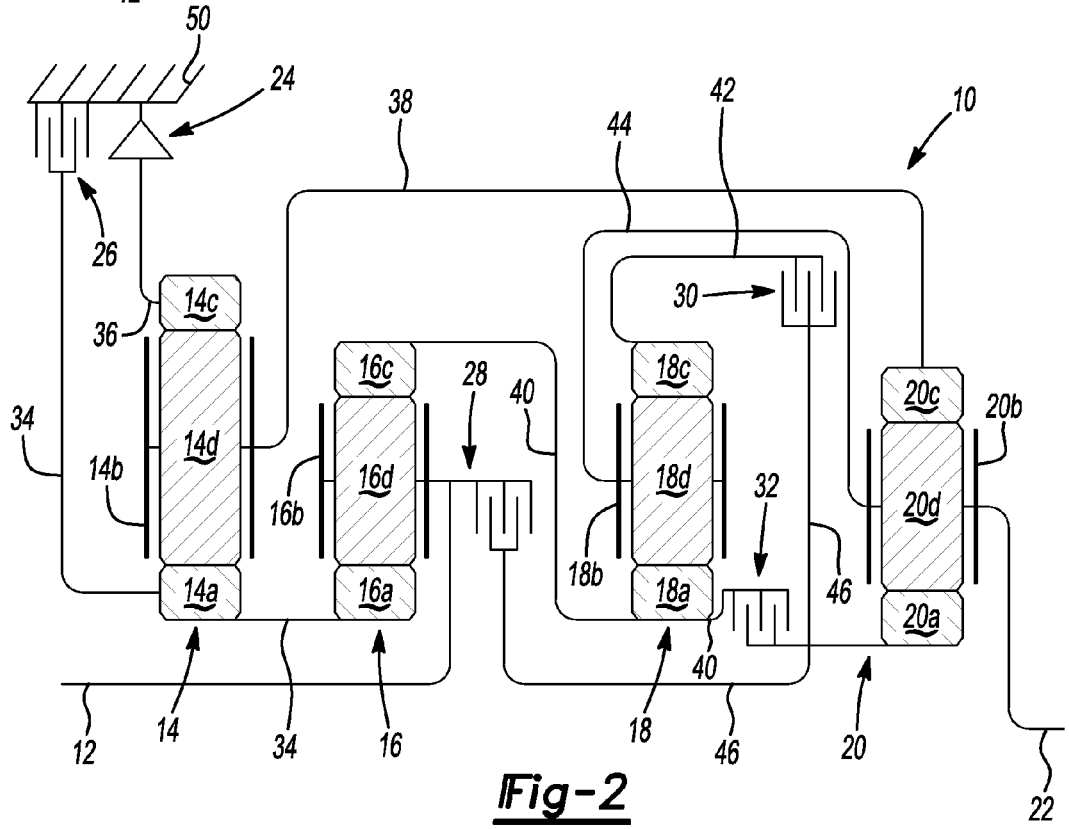
FIG. 2 is a schematic representation of an example of a transmission shown in FIG. 1 in accordance with the present invention.

Referring now to FIG. 2, a stick diagram presents a schematic layout of an example of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

In an example of the present invention, a first planetary gear set 14 is a simple planetary gear set. More specifically, planetary gear set 14 includes a sun gear member 14A, a ring gear member 14C and a carrier member 14B that rotatably supports a set of planet gears 14D (only one shown). Sun gear member 14A is connected for common rotation with a first shaft or interconnecting member 34. Ring gear member 14C is connected for common rotation with a second shaft or interconnecting member 36. Carrier member 14B is connected for common rotation with a third shaft or interconnecting member 38. The planet gears 14D are configured to intermesh with both the sun gear member 14A and the ring gear member 14C.

In another example of the present invention, a second planetary gear set 16 is a simple planetary gear set. More specifically, planetary gear set 16 includes a sun gear member 16A, a ring gear member 16C and a carrier member 16B that rotatably supports a set of planet gears 16D (only one shown). Sun gear member 16A is connected for common rotation with the first shaft or interconnecting member 34. Ring gear member 16C is connected for common rotation with a fourth shaft or interconnecting member 40. Carrier member 16B is connected for common rotation with an input shaft 12. The planet gears 16D are configured to intermesh with both the sun gear member 16A and the ring gear member 16C.

In yet another example of the present invention, a third planetary gear set 18 is a simple planetary gear set. More specifically, planetary gear set 18 includes a sun gear member 18A, a ring gear member 18C and a carrier member 18B that rotatably supports a set of planet gears 18D (only one shown).

Sun gear member 18A is connected for common rotation with the fourth shaft or interconnecting member 40. Ring gear member 18C is connected for common rotation with a fifth shaft or interconnecting member 42. Carrier member 18B is connected for common rotation with a sixth shaft or interconnecting member 44. The planet gears 18D are configured to intermesh with both the sun gear member 18A and the ring gear member 18C.

In yet another example of the present invention, a fourth planetary gear set 20 is a simple planetary gear set that includes a sun gear member 20A, a ring gear member 20C and a carrier member 20B that rotatably supports a set of planet gears 20D (only one shown). Sun gear member 20A is connected for common rotation with a seventh shaft or interconnecting member 46. Ring gear member 20C is connected for common rotation with the third shaft or interconnecting member 38. Carrier member 20B is connected for common rotation with the sixth shaft or interconnecting member 44 and an output shaft 22. The planet gears 20D are configured to intermesh with both the sun gear member 20A and the ring gear member 20C.

The input shaft or member 12 is preferably continuously connected to an engine (not shown) or to a turbine of a torque converter (not shown). The output shaft or member 22 is preferably continuously connected with a final drive unit or transfer case (not shown).

The torque-transmitting mechanisms or selectable one-way clutch 24, brake 26, and first, second and third clutches 28, 30, 32 allow for selective interconnection of the shafts or interconnecting members 34-46, members of the planetary gear sets 14-20 and the housing 50. For example, the selectable one-way clutch 24 is selectively engageable to connect the second shaft or interconnecting member 36 with the stationary element, ground, or the transmission housing 50. The brake 26 is selectively engageable to connect the first shaft or interconnecting member 34 with the stationary element, ground, or the transmission housing 50. The first clutch 28 is selectively engageable to connect the input shaft or member 12 with the seventh shaft or interconnecting member 46. The second clutch 30 is selectively engageable to connect the fifth shaft or interconnecting member 42 with the seventh shaft or interconnecting member 46. The third clutch 32 is selectively engageable to connect the fourth interconnecting shaft or member 40 with the seventh interconnecting shaft or member 46.

Figure 3:
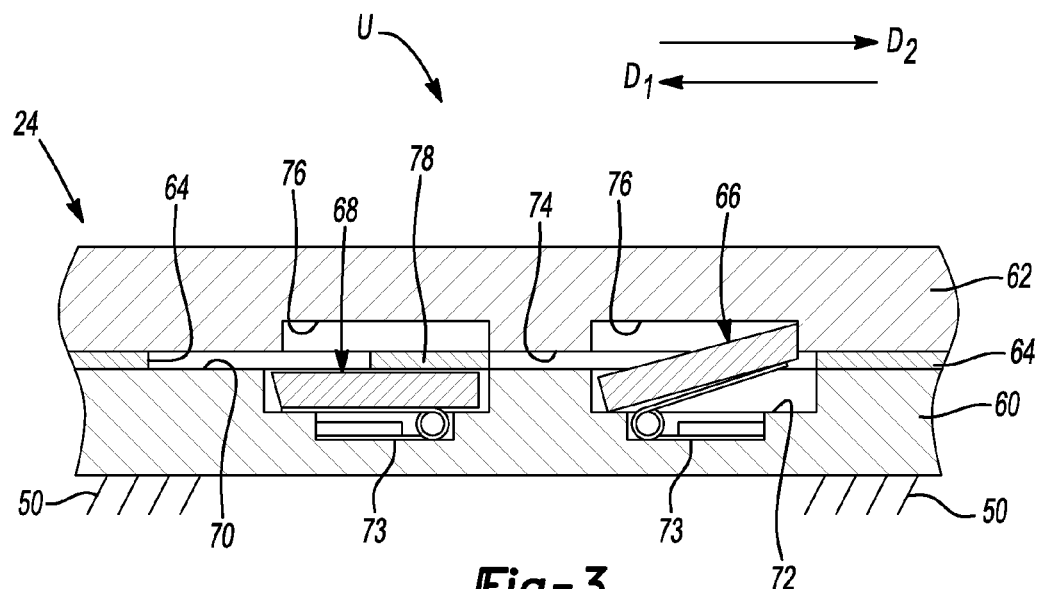
FIG. 3 is a cross section of a selectable one-way clutch in an activated or unlocked position in accordance with the present invention.
Figure 4:
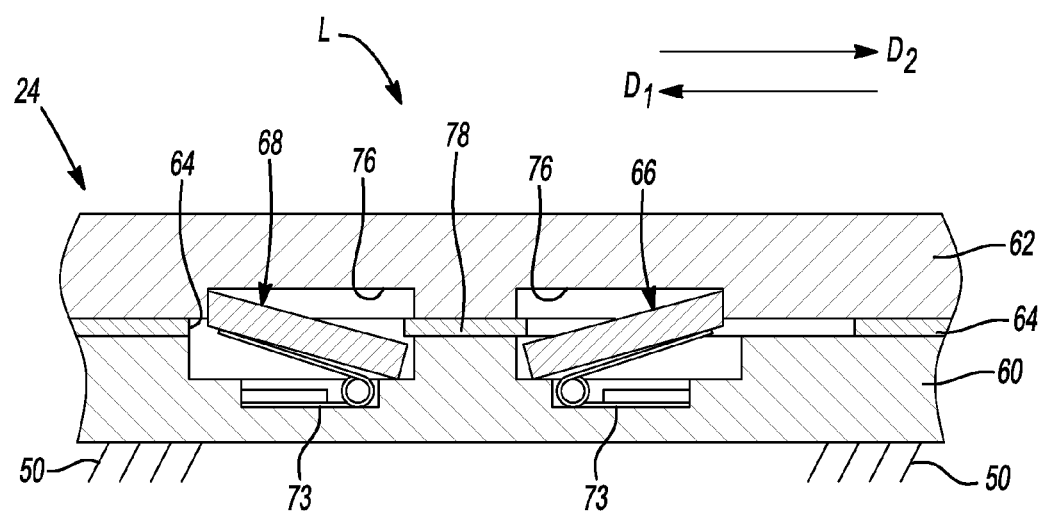
FIG. 4 is a cross section of a selectable one-way clutch in a deactivated or locked position in accordance with the present invention.

Referring now to FIGS. 3 and 4, two cross-section views of the selectable one-way clutch 24 are shown in each of an activated or unlocked U position (FIG. 3) and a deactivated or locked L position (FIG. 4). In the embodiment as shown, the selectable one-way clutch 24 is a strut-type selectable one-way clutch having a plurality of forward and reverse struts that are locking mechanisms used to provide a mechanical connection between rotating members. However, those skilled in the art will appreciate that other types of selectable one-way clutches employing other types of locking mechanisms may be used as well. Several examples of selectable one-way clutches that may be used are described in SAE Paper No. SAE-2009-01-0509, which is herein incorporated by reference in its entirety. The selectable one-way clutch includes an input disc or member 60, an output disc or member 62, a selection disc or member 64, a selection disc actuator (not shown), a forward locking mechanism 66 and a reverse locking mechanism 68. As previously stated when describing FIG. 2, the selectable one-way clutch is selectively engageable to connect the second shaft or interconnecting member 36 with the stationary element, ground, or the transmission housing 50. The input member 60 is fixed to a stationary member or transmission housing 50. The output member 62 is rotationally connected to the second shaft or interconnecting member (not shown). The selection disc 64 is disposed between the input and output discs 60, 62 and remains stationary relative to the input disc 60 except when activated by the selection disc actuator (not shown).

The input member 60 has a surface 70 that includes a plurality of recesses 72. One of the forward and reverse locking mechanisms 66, 68 is mounted in each recess. The output member 62 has a surface 74 facing the first surface 70 of the input member 60 and includes recesses 76 for receiving and engaging the locking mechanisms 66, 68. When each of the locking mechanisms 66, 68 are in the locked position L, as shown in FIG. 5, the locking mechanisms 66, 68 of the input member 60 engage with recesses 76 of the output member 62 thus preventing relative rotation between the input member 60 and the output member 62. The selection disc 64 includes an actuation feature 78 that when activated, as in FIG. 3, rotates over the reverse locking mechanism 68 thus preventing the reverse locking mechanism 68 from engaging with one of the recesses 76 of the output member 62. A biasing member such as a spring 73 is in contact with both the locking mechanisms 66, 68. As seen in both FIGS. 3-4, the spring 73 is used to urge the reverse locking mechanism 68 out of the corresponding recess 72 and into the locked position L. Upon activation of the selection disc 64 into the unlocked position U, the selectable one-way clutch 24 operates in the same manner as a traditional one-way clutch. In the example transmission, when the selectable one-way clutch 24 is in the locked position L the selectable one-way clutch 24 interconnects the third member 14C of the first planetary gear set 14 with the stationary member or transmission housing 50. When the selectable one-way clutch 24 is in the unlocked position U the selectable one-way clutch 24 prevents rotation of the third member 14C of the first planetary gear set 14 in a first rotary direction D1 and allows rotation of the third member 14C of the first planetary gear set 14 in a second rotary direction D2.

It should be noted that the selectable one-way clutch 32 can include up to four modes of operation. For example, the selectable one-way clutch 32 may also include an open position O. In the open position, both the locking mechanisms 66 and 68 are depressed into their respective recesses 72 located in the input member 60. The selectable one-way clutch 32 may also include another unlocked position as well. In this position, the actuation feature 78 rotates over the forward locking mechanism 66, thus preventing the forward locking mechanism 66 from engaging with one of the recesses 76 of the output member 62, while the reverse locking mechanism 68 engages with the corresponding recess 76 in the output member.

In yet another example of the invention, the transmission 10 has two operating modes; automatic mode A and manual mode M. In automatic mode A, the transmission 10 is operated such that the selectable one-way clutch 24 is deactivated or in locked position L when in reverse gear state R and activated or in unlocked position U when in first through eighth gear state $1^{st}$-$8^{th}$. When the transmission 10 is engaged in sixth through eighth gear state $6^{th}$-$8^{th}$, the selectable one-way clutch operates in glide or overrun mode. In glide mode, the output disc 62 spins in the second rotational direction D2 show in FIG. 3. Glide mode allows for drag losses that are significantly less than experienced with a traditional clutch mechanism. It should be noted that while FIG. 5 shows the locked position L and the unlocked position U illustrated in FIGS. 3-4, it is understood that the selectable one-way clutch 32 may use different mode selections as well. For example, in another embodiment, the selectable one-way clutch 32 could include an unlocked position where the forward locking mechanism 66 does not engage with one of the recesses 76 of the output member 62, while the reverse locking mechanism 68 engages with the corresponding recess 76 in the output member (FIGS. 3-4).

While operating the transmission 10 in manual mode M the selectable one-way clutch is deactivated or in locked position L in reverse gear state R and in first through fifth gear state $1^{st}$-$5^{th}$. The manual mode M allows the ability of the operator to utilize engine braking as the selectable one-way clutch 24 effectively acts as a solid interconnecting member and does not allow the output disc 62 to rotate relative to the input disc 60. The selectable one-way clutch 24 is activated or in unlocked position U in sixth through eighth gear state $6^{th}$-$8^{th}$ to allow for glide mode as stated above in automatic mode A.

Referring now to FIGS. 2 and 5, the operation of the example of the eight speed transmission 10 will be described. It will be appreciated that transmission 10 is capable of transmitting torque from the input shaft or member 12 to the output shaft or member 22 in at least eight forward speed states or torque ratios and at least one reverse speed state or torque ratio. Each forward and reverse speed state or torque ratio is attained by engagement of one or more of the torque-transmitting mechanisms (i.e. selectable one-way clutch 24, brake 26, and first, second and third clutches 28, 30, 32), as will be explained below. FIG. 5 is a truth table presenting the various combinations of torque-transmitting mechanisms that are activated or engaged X to achieve the various gear states.

For example, to establish reverse gear state R in automatic mode A or manual mode M, the selectable one-way clutch 24 is locked L and the brake 26 and clutch 30 are engaged or activated X. The selectable one-way clutch 24 in locked mode L connects the second shaft or interconnecting member 36 with the stationary element, ground, or the transmission housing 50. The brake 26 connects the first shaft or interconnecting member 34 with the stationary element or transmission housing 50. The clutch 30 connects the fifth shaft or interconnecting member 42 with the seventh shaft or interconnecting member 46.

To establish the first gear state $1^{st}$ in automatic mode A the selectable one-way clutch 24 is unlocked U and the brake 26 and the clutch 28 is engaged or activated X. The selectable one-way clutch 24 in unlocked mode U acts as a traditional one-way clutch between the second shaft or interconnecting member 36 and the stationary element or transmission housing 50. The brake 26 connects the first shaft or interconnecting member 34 with the stationary element or the transmission housing 50. The clutch 28 connects the input shaft or member 12 with the seventh shaft or interconnecting member 46.

To establish the first gear state $1^{st}$ in manual mode M the selectable one-way clutch 24 is locked L and the brake 26 and the clutch 28 is engaged or activated X. The selectable one-way clutch 24 in locked mode L acts as a traditional activated clutch connecting the second shaft or interconnecting member 36 and the stationary element or transmission housing 50. The brake 26 connects the first shaft or interconnecting member 34 with the stationary element or transmission housing 50. The clutch 28 connects the input shaft or member 12 with the seventh shaft or interconnecting member 46.

To establish sixth gear state 6th in automatic mode A or manual mode M, the selectable one-way clutch 24 is unlocked U and the clutches 28, 30, 32 are engaged or activated X. The selectable one-way clutch 24 in unlocked mode U acts as a traditional one-way clutch between the second shaft or interconnecting member 36 and the stationary element or transmission housing 50. The clutch 28 connects the input shaft or member 12 with the seventh shaft or interconnecting member 46. The clutch 30 connects the fifth shaft or interconnecting member 42 with the seventh shaft or interconnecting member 46. The clutch 32 connects the fourth shaft or interconnecting member 40 with the seventh shaft or interconnecting member 46. Likewise, the eight forward speed states are achieved through different combinations of selectable one-way clutch, clutch and brake mode and engagement, as shown in FIG. 5.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    first, second, third and fourth planetary gear sets each having first, second and third members, wherein the output member is continuously interconnected with the second member of the fourth planetary gear set;
    a first interconnecting member continuously interconnecting the first member of the first planetary gear set with the first member of the second planetary gear set;
    a second interconnecting member continuously interconnecting the second member of the first planetary gear set with the third member of the fourth planetary gear set;
    a third interconnecting member continuously interconnecting the third member of the second planetary gear set with the first member of the third planetary gear set;
    a fourth interconnecting member continuously interconnecting the second member of the third planetary gear set with a second member of the fourth planetary gear set; and
    five torque-transmitting mechanisms each selectively engageable to interconnect at least one of the first, second and third members with at least one other of the first, second and third members and a stationary element, and wherein the torque-transmitting mechanisms are selectively engageable in combinations of at least three to establish at least eight forward speed ratios and at least one reverse speed ratio between the input member and the output member, and wherein a first of the five torque-transmitting mechanisms is a selectable one-way clutch engageable to interconnect the third member of the first planetary gear set with the stationary member.

2. The transmission of claim 1 wherein a second of the five torque-transmitting mechanisms is selectively engageable to interconnect the first member of the first planetary gear set with a stationary member.

3. The transmission of claim 2 wherein a third of the five torque-transmitting mechanisms is selectively engageable to interconnect the second member of the second planetary gear set with the first member of the fourth planetary gear set.

4. The transmission of claim 3 wherein a fourth of the five torque-transmitting mechanisms is selectively engageable to interconnect to the first member of the third planetary gear set with the first member of fourth planetary gear set.

5. The transmission of claim 4 wherein a fifth of the five torque-transmitting mechanisms is selectively engageable to interconnect the third member of the third planetary gear set with the first member of the fourth planetary gear set.

6. The transmission of claim 1 wherein the first members are sun gears, the second members are carrier members and the third members are ring gears and the input member is continuously connected to the carrier member of the second planetary gear set and the output member is continuously connected to the carrier member of the fourth planetary gear set.

7. The transmission of claim 1 wherein the selectable one-way clutch is operable in at least four modes of operation.

8. The transmission of claim 1 is operable in at least one of an automatic mode and a manual mode.

9. The transmission of claim 8 wherein the selectable one-way clutch is operable in each of a locked position and an unlocked position, in the locked position the selectable one-way clutch interconnects the third member of the first planetary gear set with the stationary member and in the unlocked position the selectable one-way clutch prevents rotation of the third member of the first planetary gear set in a first rotary direction and allows rotation of the third member of the first planetary gear set in a second rotary direction.

10. The transmission of claim 9 wherein the selectable one-way clutch is in the locked position when the transmission is operating in at least one of the automatic or manual modes and is engaged in the reverse speed ratio and when the transmission is operating in manual mode and is engaged in the first, second, third, fourth and fifth speed ratios.

11. The transmission of claim 10 wherein the selectable one-way clutch is in the unlocked position when the transmission is operating in automatic mode and is engaged any of the eight forward speed ratios.

12. A transmission comprising:
an input member;
an output member;
first, second, third and fourth planetary gear sets each having first, second and third members, wherein the output member is continuously interconnected with the second member of the fourth planetary gear set;
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the third member of the second planetary gear set with the first member of the third planetary gear set;
a fourth interconnecting member continuously interconnecting the second member of the third planetary gear set with a second member of the fourth planetary gear set; and
five torque-transmitting mechanisms each selectively engageable to interconnect at least one of the first, second and third members with at least one other of the first, second and third members and a stationary element, and wherein the torque-transmitting mechanisms are selectively engageable in combinations of at least three to establish at least eight forward speed ratios and at least one reverse speed ratio between the input member and the output member; and
wherein the transmission is configured to operate in at least one of an automatic mode and a manual mode, and a first of the five torque-transmitting mechanisms is a selectable one-way clutch operable in each of a locked position and an unlocked position, wherein in the locked position the selectable one-way clutch interconnects the third member of the first planetary gear set with the stationary member and in the unlocked position the selectable one-way clutch prevents rotation of the third member of the first planetary gear set in a first rotary direction and allows rotation of the third member of the first planetary gear set in a second rotary direction.

13. The transmission of claim 12 wherein a second of the five torque-transmitting mechanisms is selectively engageable to interconnect the first member of the first planetary gear set with a stationary member, a third of the five torque-transmitting mechanisms is selectively engageable to interconnect the second member of the second planetary gear set with the first member of the fourth planetary gear set, a fourth of the five torque-transmitting mechanisms is selectively engageable to interconnect to the first member of the third planetary gear set with the first member of fourth planetary gear set and a fifth of the five torque-transmitting mechanisms is selectively engageable to interconnect the third member of the third planetary gear set with the first member of the fourth planetary gear set.

14. The transmission of claim 13 wherein the first members are sun gears, the second members are carrier members and the third members are ring gears.

15. The transmission of claim 14 wherein the input member is continuously connected to the carrier member of the second planetary gear set and the output member is continuously connected to the carrier member of the fourth planetary gear set.

16. The transmission of claim 12 wherein the selectable one-way clutch is in the locked position when the transmission is operating in at least one of the automatic or manual modes and is engaged in the reverse speed ratio and when the transmission is operating in manual mode and is engaged in the first, second, third, fourth and fifth speed ratios.

17. The transmission of claim 12 wherein the selectable one-way clutch is in the unlocked position when the transmission is operating in automatic mode and is engaged any of the eight forward speed ratios.

18. A transmission comprising:
an input member;
an output member;
first, second, third and fourth planetary gear sets each having a sun gear, a carrier member and a ring gear;
a first interconnecting member continuously interconnecting the sun gear of the first planetary gear set with the sun gear of the second planetary gear set;
a second interconnecting member continuously interconnecting the carrier member of the first planetary gear set with the ring gear of the fourth planetary gear set;
a third interconnecting member continuously interconnecting the ring gear of the second planetary gear set with the sun gear of the third planetary gear set;
a fourth interconnecting member continuously interconnecting the carrier member of the third planetary gear set with a carrier member of the fourth planetary gear set; and
five torque-transmitting mechanisms each selectively engageable to interconnect at least one of the first, second and third members with at least one other of the first, second and third members and a stationary element, and wherein the torque-transmitting mechanisms are selectively engageable in combinations of at least three to establish at least eight forward speed ratios and at least one reverse speed ratio between the input member and the output member; and
wherein the transmission is configured to operate in at least one of an automatic mode and a manual mode, and a first of the five torque-transmitting mechanisms is a selectable one-way clutch operable in each of a locked position and an unlocked position, in the locked position the selectable one-way clutch interconnects the ring gear of the first planetary gear set with the stationary member and in the unlocked position the selectable one-way clutch prevents rotation of the ring gear of the first planetary gear set in a first rotary direction and allows rotation of the ring gear of the first planetary gear set in a second rotary direction.

19. The transmission of claim 18 wherein a second of the five torque-transmitting mechanisms is selectively engageable to interconnect the sun gear of the first planetary gear set with a stationary member, a third of the five torque-transmitting mechanisms is selectively engageable to interconnect the carrier member of the second planetary gear set with the sun gear of the fourth planetary gear set, a fourth of the five torque-transmitting mechanisms is selectively engageable to interconnect to the sun gear of the third planetary gear set with the sun gear of fourth planetary gear set and a fifth of the five torque-transmitting mechanisms is selectively engageable to interconnect the ring gear of the third planetary gear set with the sun gear of the fourth planetary gear set.

20. The transmission of claim 19 wherein the input member is continuously connected to the carrier member of the second planetary gear set and the output member is continuously connected to the carrier member of the fourth planetary gear set.

* * * * *